Feb. 20, 1934.  A. E. EDWARDS  1,948,168
SECTIONAL DRAG CONVEYER
Filed March 21, 1932   2 Sheets-Sheet 2
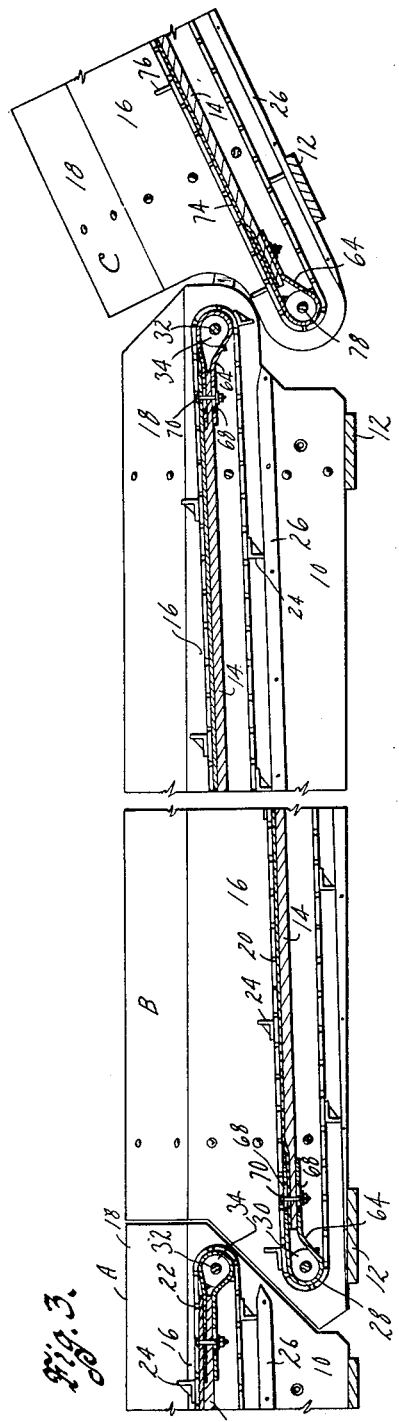
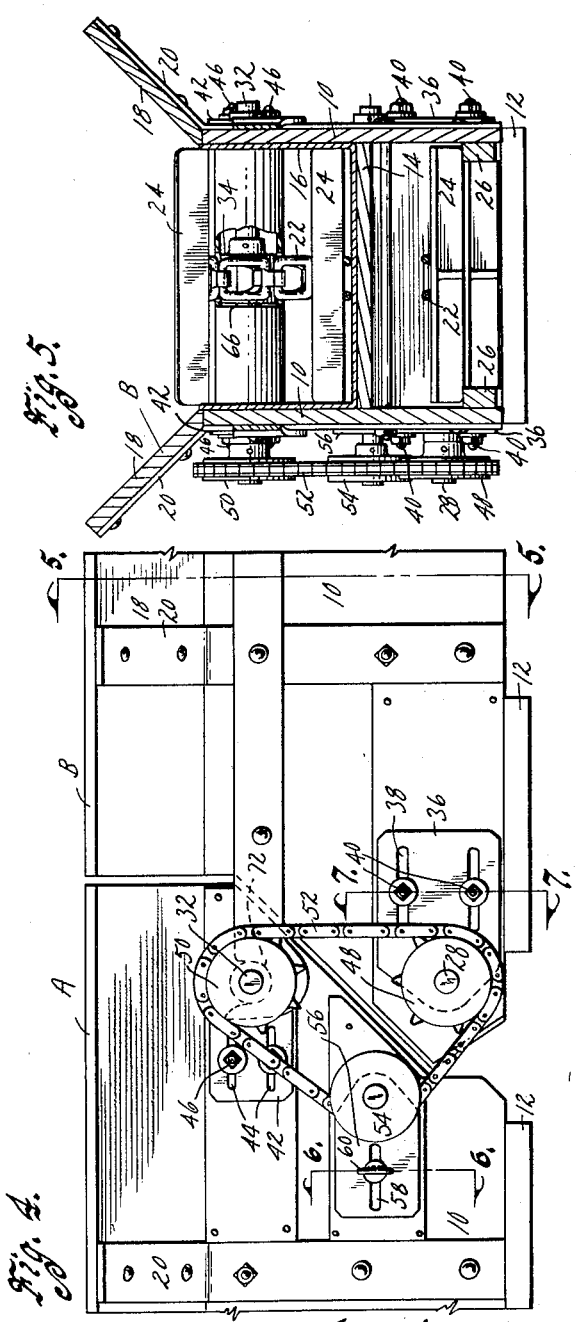
Inventor
Albert E. Edwards
by Bair, Freeman & Sinclair
Attorneys Patented Feb. 20, 1934

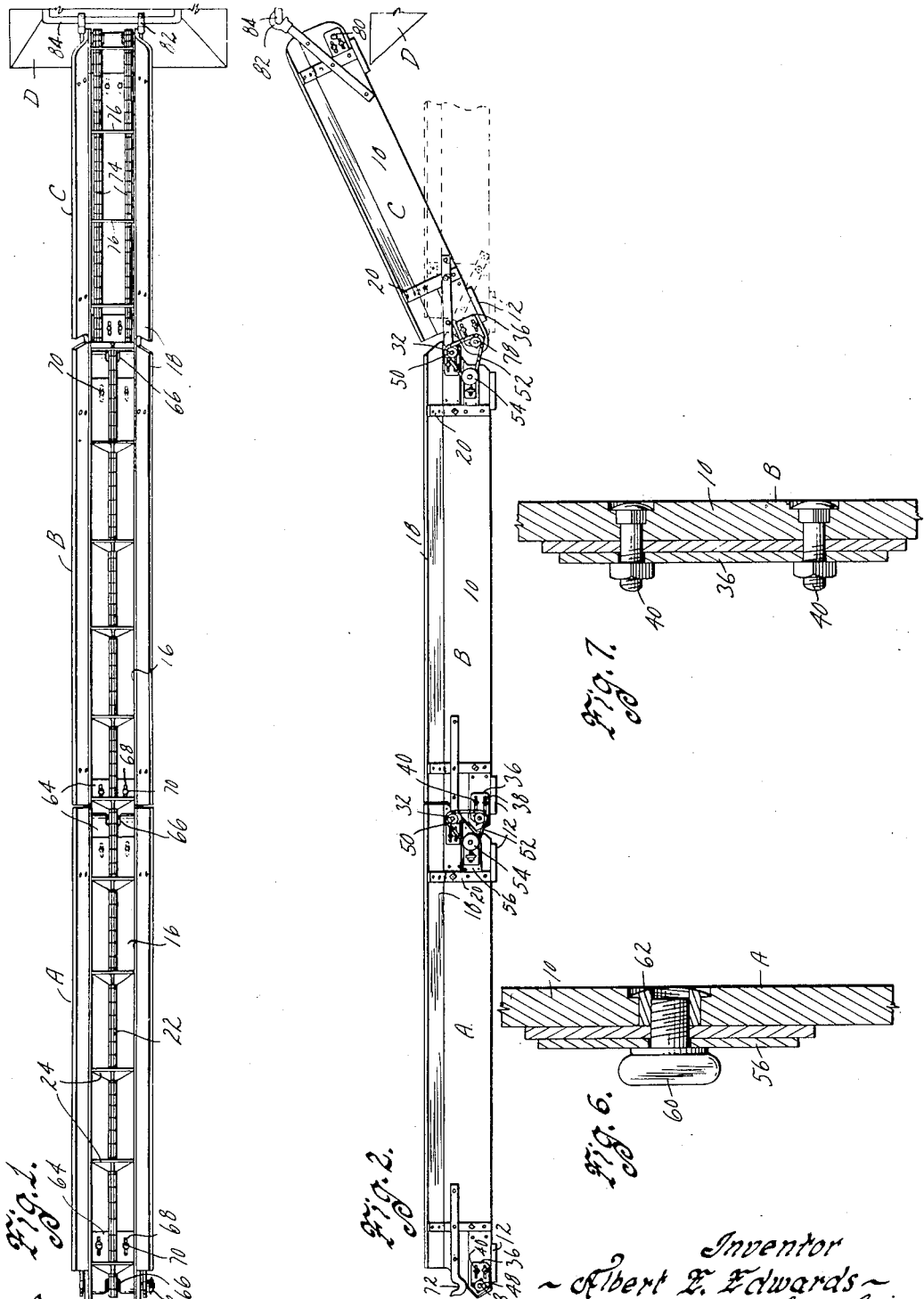

1,948,168

UNITED STATES PATENT OFFICE

1,948,168

SECTIONAL DRAG CONVEYER

Albert E. Edwards, Fort Dodge, Iowa

Application March 21, 1932. Serial No. 600,291

1 Claim. (Cl. 198—92)

The object of this invention is to provide an improved construction for a drag conveyer which is of sectional formation and made up of a plurality of units which may be selectively connected in series at pleasure and to any desired extent, each section being of completely unitary structure, not only as to the frame portion, but also as to the conveying mechanism.

A further object of the invention is to provide an improved sectional drag conveyer composed of a plurality of unitary sections having improved means for detachably connecting the sections in series.

Still another object is to provide an improved sectional drag conveyer in which the individual units are complete in themselves and in which the conveying elements are so arranged as to conveniently discharge substance from one section upon the conveying elements of the next succeeding section in the series.

Another and further object of the invention is to provide a sectional drag conveyer of unitary formation having improved means for transmitting driving force from the conveying mechanism of one section to the conveying mechanism of another section in series.

With these and other objects in view my invention consists in the construction, arrangement and combination of the various parts of my device, whereby the objects contemplated are obtained, as hereinafter more fully set forth, pointed out in my claim, and illustrated in the accompanying drawings, in which:—

Figure 1 is a plan view showing the assembly of three units constructed in accordance with my invention.

Figure 2 is a side elevation of the same.

Figure 3 is an enlarged longitudinal section of a portion of the device.

Figure 4 is a detail side elevation illustrating the adjacent and connected ends of two sections and the means for transmitting driving force from the conveying mechanism of one section to that of the other.

Figure 5 is a cross section on the line 5—5 of Figure 4.

Figure 6 is a detail section on the line 6—6 of Figure 4.

Figure 7 is a detail section on the line 7—7 of Figure 4.

The present invention relates to a drag conveyer particularly designed for transporting substance such as ears of corn from a crib or wagon to a corn shelling machine and it embodies features which make it possible to very conveniently alter the length of the conveyer assembly by adding or removing conveyer sections or units which are complete in themselves.

In the drawings I have illustrated an assembly made up of three sections designated generally as A, B and C. The sections A and B are alike in construction and any desired number of similar sections may be employed in series. The section C is the terminal or delivery section and it is slightly different in construction from the other sections and is adapted to be arranged in upwardly inclined position for delivering substance to a receptacle such as D, which represents the hopper of a corn shelling machine.

The frame of each section A and B includes a pair of spaced side walls 10 rigidly connected at their lower margins by cleats 12 and intermediate their upper and lower margins by a solid partition wall 14. The side walls 10 constitute the main elements of a housing for the conveying mechanism and this housing is divided longitudinally by the partition member 14 into an upper compartment which houses the operating portion of the conveying mechanism and a lower compartment which houses the return portions thereof. The members 10 and 14 may be formed of wood, and if so—the upper compartment preferably is provided with a sheet metal lining 16 fixed to the upper face of the partition member 14 and to the inner faces of the side walls 10.

To the upper margins of the side walls 10 are attached outwardly sloping extension boards 18 which cooperate with the members 10 to form the trough for the conveyer and which are provided with suitable metal brace straps 20.

Each section A and B is provided with a conveying mechanism which, as here shown, includes a single chain endless drag belt 22 provided at intervals with transversely extending drag bars 24. The upper flight of the conveying mechanism travels on the lined surface of the partition member 14 and the lower flight is supported by bars 26 fixed to the inner faces and near the lower margins of the side walls 10, and which constitute flight carriers engaged by the ends of the drag bars 24.

The initial end of the conveyer mechanism embraces a transversely extending drive shaft 28 and engages a sprocket pulley 30, while the terminal end embraces a transverse shaft 32 and engages a sprocket pulley 34 thereon.

It will be observed that each conveying mechanism is inclined upwardly in its housing from its initial to its terminal end, and that the terminal end is located sufficiently high that it may overlie the initial end of the next section in the series. It will also be noted that the partition member 14 or base plate upon which the operating flight of the drag conveyer runs is inclined upwardly from its initial to its terminal end.

It will also be noted that the lower part of the frame of each section is projected at its initial end and that the upper part of each frame is projected at its terminal end so that the terminal projection of each unit may overlie the initial projection of the next succeeding unit. This arrangement permits the terminal shaft 32 of one unit to be in substantially the same vertical plane as the initial or drive shaft 28 of the next unit, thus providing a convenient means whereby the terminal portion of one conveying mechanism may overlie the initial portion of the next unit. This arrangement is clearly shown in Figure 3.

The driving shafts 28 at the initial ends of the units preferably are carried by boxing plates 36 which are formed with longitudinal slots 38 and secured to the conveyer housings by bolts 40 extending through said slots. This provides means for tightening the conveyer chains. Likewise, the terminal shafts 32 may be carried by boxing plates 42 provided with longitudinal slots 44 and adjustably secured to the housing by bolts 46.

The shaft 28 at the initial end is provided with a driving pulley 48 of sprocket form and the shaft 32 at the terminal end is provided with a sprocket pulley 50. The pulleys 48 and 50 at the adjacent ends of units in a series are engaged by a driving chain 52 whereby the conveying mechanisms of the sections are interconnected. The drive chain 52 preferably runs over an idler pulley 54 which is carried by a boxing plate 56 having a longitudinal slot 58. Through the slot 58 is mounted a thumb bolt 60 engaging in a threaded socket 62 carried by one of the wall members 10, thus providing a convenient means for adjusting the position of the idler pulley 54 and tightening the chain 52.

In the operation of the associated conveying mechanisms, power may be applied from any suitable source to the conveyer shaft 28 at the initial end of the first section A by means not shown.

To each end of the partition member or base plate 14 is fixed a sheet steel guard member or hood 64 which extends around the adjacent conveyer shaft 28 or 32 and which is notched for the conveyer sprocket 30 or 34 as indicated particularly at 66 in Figure 1. These guard members may also be adjustably mounted by means of slots 68 and bolts 70.

At its initial end each unit is provided with upwardly opening hooks 72 projecting beyond the end of the frame and adapted to engage a portion of the conveyer shaft 32 constituting trunnions at the terminal end of another section. In this manner the units are detachably connected and held in longitudinal alignment in the series.

The construction of the terminal or delivery unit C is similar in many respects to that previously described. It includes substantially the same kind of a frame or housing, the parts being the same except as herein noted, and designated by the same reference numerals.

In the section C the conveying mechanism preferably includes a double chain endless conveyer belt, which is designated by the numeral 74, connected by transverse drag bars 76. The conveyer shafts 78 and 80 of this unit may be in the same plane longitudinally of the device. In other words—it is not necessary to incline the conveying mechanism upwardly from the initial to the terminal end of the unit because the unit itself is usually arranged in inclined position as shown. For this reason the bedplate or partition member 14' of this unit is arranged in a plane parallel with the upper and lower margins of the housing instead of being inclined relative thereto.

At its terminal end the unit C is provided with downwardly opening projecting hooks 82 which are adapted to engage a part 84 on the sheller for the purpose of holding the terminal end of the section in a position where it overhangs the hopper D for delivering substance thereto.

As before stated, any desired number of sections similar to A and B may be connected in series with a terminal section C. Each section is complete in itself, not only as to the structural frame or housing, but also as to the conveying means and the conveying means of adjacent sections are operatively connected by means including the sprocket drive chain 52. The inclined arrangement of the conveying mechanism in each of the units such as A and B, together with the projecting arrangement of the initial and terminal ends of the housing, makes it convenient to arrange the units in such manner that the terminal end of one conveyer overlies the initial end of the next adjacent conveyer.

It will be noted that in assembling the sections in series it is only necessary to place the units end to end and cause the shafts 32 to engage in the connecting hooks 72, whereby the structural elements are detachably connected. Then the conveying elements are operatively connected by loosening the thumb bolt 60, moving the idler pulley 54 toward the plane of the shafts 28 and 32, and then applying the drive chain 52 and again tightening the idler pulley and setting the thumb bolt.

The arrangement whereby each unit is complete in itself with respect to its conveying mechanism is believed to be a great advantage in a sectional drag conveyer because it obviates the necessity of making any alteration whatsoever in the length of the conveyer belts or chains. The inclined and overlapping arrangement of the unitary conveying mechanism is also important in connection with the handling of substance such as corn or other relatively small objects.

Some changes may be made in the construction and arrangement of the parts of my device without departing from the real spirit and purpose of my invention, and it is my intention to cover by my claim any modified forms of structure or use of mechanical equivalents, which may be reasonably included within its scope.

I claim as my invention:—

In a conveyer structure, a conveyer section comprising a pair of sides, a partition wall between said sides, a shaft mounted at each end of said conveyer section, one of said shafts being adjustably mounted for movement longitudinally of said conveyer section, sprockets, one on each shaft, a conveyer chain extending along said partition wall from one sprocket to the other one, a tubular guide at one end of said partition wall and surrounding said adjustably mounted shaft and having a mounting flange and means for mounting said flange on said partition wall for slidable movement longitudinally thereof in accordance with the adjustment of said adjustably mounted shaft.

ALBERT E. EDWARDS.